(12) United States Patent
Shishihara

(10) Patent No.: US 9,169,873 B2
(45) Date of Patent: Oct. 27, 2015

(54) ROLLING BEARING UNIT

(71) Applicant: JTEKT CORPORATION, Osaka-shi, Osaka (JP)

(72) Inventor: Yuki Shishihara, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/448,518

(22) Filed: Jul. 31, 2014

(65) Prior Publication Data

US 2015/0043853 A1  Feb. 12, 2015

(30) Foreign Application Priority Data

Aug. 8, 2013 (JP) .................................. 2013-165303

(51) Int. Cl.
F16C 33/66 (2006.01)

(52) U.S. Cl.
CPC ......... F16C 33/6618 (2013.01); F16C 33/6607 (2013.01); F16C 33/6622 (2013.01); F16C 33/6614 (2013.01); F16C 33/6629 (2013.01)

(58) Field of Classification Search
CPC ............. F16C 33/6607; F16C 33/6618; F16C 33/6629
USPC .................... 384/462, 463, 473, 474
See application file for complete search history.

(56) References Cited

U.S. PATENT DOCUMENTS

| 3,019,065 A | 1/1962 | Neeley |
| 7,918,606 B2* | 4/2011 | Akamatsu et al. ............ 384/462 |
| 2009/0103844 A1* | 4/2009 | Kobayashi et al. ........... 384/462 |
| 2011/0206306 A1 | 8/2011 | Urano |
| 2012/0301065 A1 | 11/2012 | Mori et al. |

FOREIGN PATENT DOCUMENTS

| EP | 2306037 A1 | 4/2011 |
| JP | A-2005-180629 | 7/2005 |
| JP | 20061226427 A | 8/2006 |
| WO | WO 2010/010897 A1 | 1/2010 |

OTHER PUBLICATIONS

May 27, 2015 Extended Search Report issued in European Application No. 14180225.6.

* cited by examiner

*Primary Examiner* — Phillip A Johnson
(74) *Attorney, Agent, or Firm* — Oliff PLC

(57) ABSTRACT

A rolling bearing unit includes: a rolling bearing including an inner ring, an outer ring and a plurality of rolling elements disposed between the inner ring and the outer ring; an annular outer ring spacer disposed adjacent to one axial end of the rolling bearing, the outer ring spacer having a grease reservoir in the form of a groove extending along the circumferential direction of the outer ring spacer, and an opening that provides communication between the grease reservoir and the inside of the rolling bearing; and grease retained in the grease reservoir. Channels are formed in the grease to extend from the opening along the axial direction of the outer ring spacer.

9 Claims, 5 Drawing Sheets

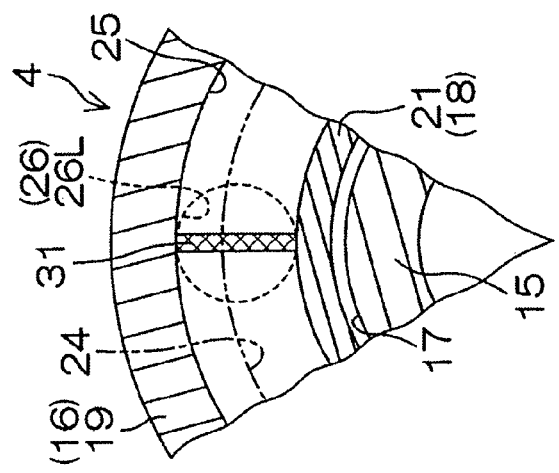
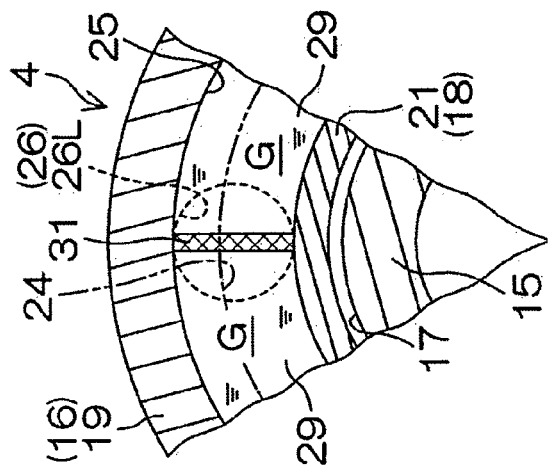
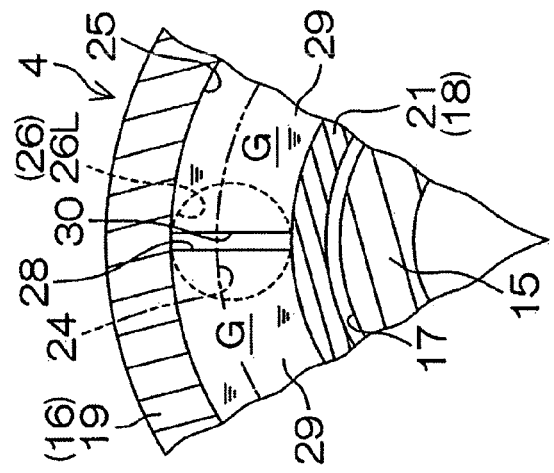

OVER ENTIRE RANGES IN AXIAL AND RADIAL DIRECTIONS

OVER ENTIRE RANGE IN AXIAL DIRECTION
BUT OVER PART OF ENTIRE RANGE IN RADIAL DIRECTION

OVER PART OF ENTIRE RANGE IN AXIAL DIRECTION
BUT OVER ENTIRE RANGE IN RAIDAL DIRECTION

ROLLING BEARING UNIT

INCORPORATION BY REFERENCE

The disclosure of Japanese Patent Application No. 2013-165303 filed on Aug. 8, 2013 including the specification, drawings and abstract is incorporated herein by reference in its entirety.

BACKGROUND OF THE INVENTION

1. Field of the Invention

The invention relates to a rolling bearing unit.

2. Description of the Related Art

Conventionally, grease lubrication has been widely adopted to lubricate rolling bearing units. In the case of grease lubrication, in order to maintain satisfactory lubrication performance even under severe lubrication conditions such as a high-temperature condition, a high-speed rotation condition and a high-load condition, a grease reservoir is formed in an outer ring spacer for a bearing and lubricant reserved in the grease reservoir is supplied to the bearing. Bearing units having such a mechanism are described in WO 2010/010897 and Japanese Patent Application Publication No. 2005-180629 (JP 2005-180629 A).

WO 2010/010897 describes a rolling bearing unit including an inner ring, an outer ring, a plurality of balls, a cage, a seal and an annular grease reserving member. The balls are rolling elements interposed between the inner ring and the outer ring. The cage retains the balls located at prescribed intervals in the circumferential direction. One axial end of an annular space defined between the inner ring and the outer ring is sealed by the seal. The grease reserving member is disposed near an annular groove located adjacent to a guide surface of the outer ring, which guides rotation of the cage. The lubricant is reserved in the grease reserving member.

JP 2005-180629 A describes a rolling bearing including an inner ring, an outer ring, a plurality of rolling elements, a grease reservoir forming member and a clearance forming piece. The rolling elements are interposed between raceway surfaces of the inner and outer rings. The grease reservoir forming member is disposed in contact with the outer ring. The clearance forming piece extends from the grease reservoir to a position near the raceway surface of the outer ring to define a clearance along an inner peripheral face of the outer ring.

If such a rolling bearing unit in which grease is sealingly enclosed is used for a long time, cracks (voids) may be formed in the grease in the grease reservoir as base oil that is contained in the grease is supplied. If such cracks are successively connected to each other over the entire circumference of the bearing, at a position near a communication passage between the grease reservoir and the bearing, the base oil in the grease near the bearing is depleted although the grease remains in the grease reservoir. As a result, a supply of the base oil is interrupted. In the bearing unit in which a supply of the base oil is interrupted, the bearing lubrication performance is lost after the base oil in the bearing is completely consumed. After the bearing lubrication performance is lost, it is difficult to keep using the bearing unit for a long time.

JP 2005-180629 A describes a configuration in which a small clearance is defined between the outer ring and the clearance forming piece. With this configuration, the base oil that is contained in the grease is supplied to a position near the raceway surface of the outer ring, in order to prolong the service life of the bearing having a satisfactory lubrication performance. However, with the technique described in the JP 2005-180629 A, the shape of the clearance forming piece needs to be accurately designed to form a small clearance. This complicates the configuration of the rolling bearing unit.

SUMMARY OF THE INVENTION

One object of the invention is to provide a rolling bearing unit that is simply configured and that makes it possible to keep supplying base oil contained in grease to a bearing for a long time, thereby prolonging its service life.

A rolling bearing unit according to an aspect of the invention includes: a rolling bearing including an inner ring, an outer ring and a plurality of rolling elements disposed between the inner ring and the outer ring; an annular spacer disposed adjacent to one axial end of the rolling bearing, the annular spacer having a grease reservoir in the form of a groove extending along a circumferential direction of the annular spacer, and a flow passage that provides communication between the grease reservoir and an inside of the rolling bearing; and grease retained in the grease reservoir. At least one channel is foamed in the grease to extend along an axial direction of the annular spacer.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3A and FIG. 3B are views for describing the flow of base oil that is contained in grease, wherein FIG. 3A is an enlarged sectional view illustrating main portions in FIG. 1, and FIG. 3B is a sectional view obtained by cutting the rolling bearing unit along the line IIIb-IIIb in FIG. 3A;

FIG. 4A to FIG. 4C are sectional views of the rolling bearing unit, for sequentially describing steps related to formation of channels in the grease illustrated in FIG. 2.

DETAILED DESCRIPTION OF EMBODIMENTS

Figure 1:
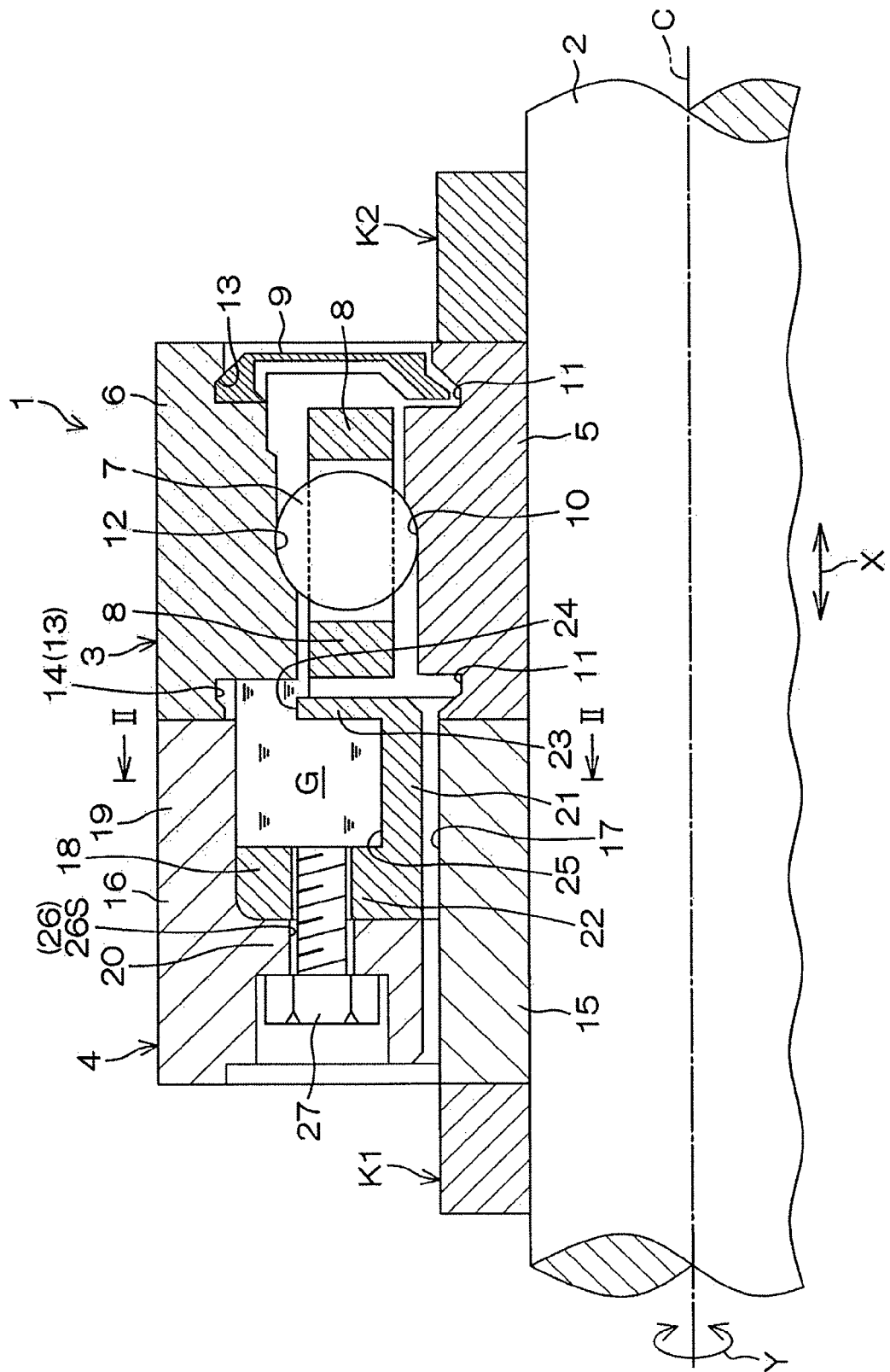
FIG. 1 is a sectional view of a rolling bearing unit according to an embodiment of the invention.
Figure 2:
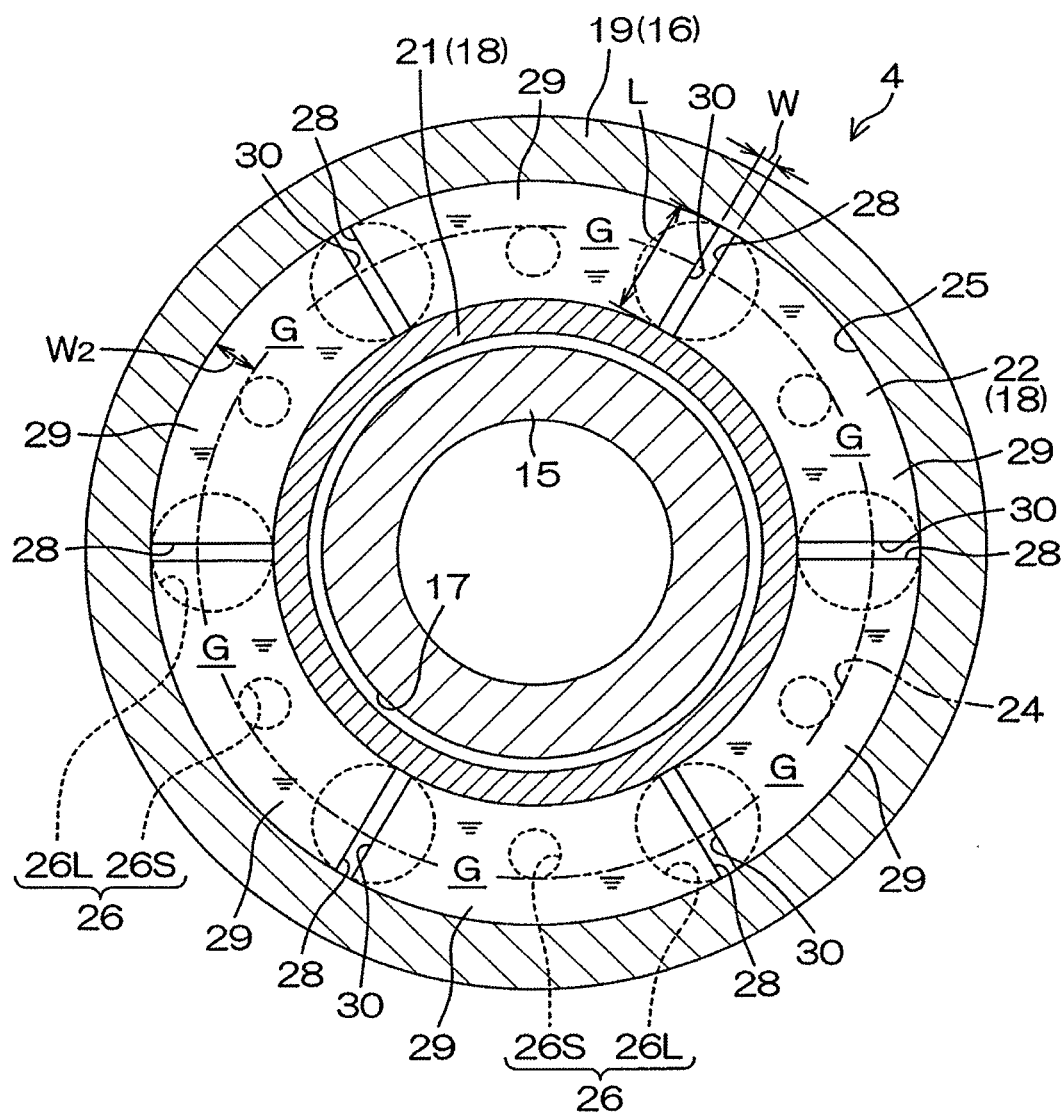
FIG. 2 is a sectional view of a grease reserving member in FIG. 1, illustrating a section obtained by cutting the rolling bearing unit along the line II-II in FIG. 1.

Hereinafter, an embodiment of the invention will be described with reference to the accompanying drawings. FIG. 1 is a sectional view of a rolling bearing unit 1 according to an embodiment of the invention. FIG. 2 is a sectional view of a grease reserving member 4 in FIG. 1, illustrating a section obtained by cutting the rolling bearing unit 1 along the line II-II in FIG. 1. The rolling bearing unit 1 is a device that supports, example, a main spindle 2 (on which a rolling bearing is supported) of a machine tool.

As illustrated in FIG. 1, the rolling bearing unit 1 includes a rolling bearing 3 and the grease reserving member 4. The rolling bearing 3 is an angular contact ball bearing. The grease reserving member 4 is an example of a spacer according to the invention, which is disposed adjacent to the rolling bearing 3. As illustrated in FIG. 1, the rolling bearing 3 includes an inner ring 5, an outer ring 6, rolling elements 7, a cylindrical cage 8 and a seal 9. The inner ring 5 is fitted onto the main spindle 2. The outer ring 6 is fitted to an inner periphery of a housing (not illustrated) of the machine tool. The rolling elements 7 are interposed between the inner ring 5 and the outer ring 6. The cage 8 retains the rolling elements 7 located at prescribed intervals in a circumferential direction Y. The seal 9 seals an annular space defined between the inner ring 5 and the outer ring 6, at one end (right end in FIG. 1; the end on the opposite side of the annular space from the grease reserving member 4) in an axial direction X (axial direction of the main spindle 2). In FIG. 1, the angular contact ball bearing is adopted as the rolling bearing 3. Alternatively, a deep groove ball bearing, a cylindrical roller bearing, a tapered roller bearing or the like may be adopted as the rolling bearing 3.

An inner ring raceway surface 10, on which the rolling elements 7 roll, is formed in a center portion of an outer peripheral face of the inner ring 5 in the axial direction X. First seal grooves 11 are formed in opposite end portions of the outer peripheral face of the inner ring 5 in the axial direction X. An inner peripheral portion (seal lip) of the seal 9 is fitted in one of the first seal grooves 11, which is located more distant from the grease reserving member 4 than the other first seal groove 11 is in the axial direction X (the first seal groove 11 located on the right side in FIG. 1). An outer ring raceway surface 12, on which the rolling elements 7 roll, is formed in a center portion of an inner peripheral face of the outer ring 6 in the axial direction X. Second seal grooves 13 are formed in opposite end portions of the inner peripheral face of the outer ring 6 in the axial direction X. An outer peripheral portion (seal lip) of the seal 9 is fitted in one of the second seal grooves 13, which is located more distant from the grease reserving member 4 than the other second seal groove 13 is in the axial direction X (the second seal groove 13 located on the right side in FIG. 1).

The second seal groove 13 located closer to the grease reserving member 4 in the axial direction X (the second seal groove 13 on the left side in FIG. 1) serves an annular groove 14 in which grease G is reserved. The annular groove 14 is defined by an annular recess formed in an end portion of the outer ring 6, which is located close to the grease reserving member 4. The annular groove 14 is filled with the grease G for initial lubrication in advance. As illustrated in FIG. 1 and FIG. 2, the grease reserving member 4 includes an inner ring spacer 15, an outer ring spacer 16, and an oil reserving ring 18. The inner ring spacer 15 is fitted onto the main spindle 2. The outer ring spacer 16 is formed so as to surround the inner ring spacer 15 to define an annular space 17 between the outer ring spacer 16 and the inner ring spacer 15. The outer ring spacer 16 is fitted to the inner periphery of the housing (not illustrated) of the machine tool. The oil reserving ring 18 is disposed in the annular space between the inner ring spacer 15 and the outer ring spacer 16.

The inner ring spacer 15 is formed into a cylindrical shape and brought into contact with an outer peripheral face of the main spindle 2. The inner ring spacer 15 fitted on the main spindle 2 is positioned in a state where one end face of the inner ring spacer 15 in the axial direction X is in contact with an end face of the inner ring 5 as illustrated in FIG. 1. This positioning is made by spacers K1, K2 between which a cylindrical body formed by arranging the inner ring 5 and the inner ring spacer 15 next to each other is held in the axial direction X. The spacers K1, K2 hold the cylindrical body from both sides in the axial direction X. The spacers K1, K2 are fixed to the main spindle 2.

The outer ring spacer 16 is in the form of a bottomed cylinder, and is a single-piece member having a tubular peripheral wall 19 and an annular plate-shaped bottom wall 20 that extends radially inward from a peripheral edge of one axial end of the peripheral wall 19. When the outer ring spacer 16 is fitted onto the inner ring spacer 15 so that the inner ring spacer 15 passes through a center opening formed in the bottom wall 20, an annular space 17 is defined between the outer ring spacer 16 and the inner ring spacer 15. The annular space 17 is open on the rolling bearing 3-side, and is closed on the opposite side of the annular space 17 from the rolling bearing 3. In the following description, "axial direction of the outer ring spacer 16" denotes the axial direction of the peripheral wall 19 of the outer ring spacer 16, and coincides with the axial direction X of the main spindle 2 in the present embodiment.

As illustrated in FIG. 1, the outer ring spacer 16 is positioned in a state where one end face of the outer ring spacer 16 in the axial direction X is in contact with an end face of the outer ring 6 as illustrated in FIG. 1. This positioning is made by a positioning member (not illustrated) fixed to, for example, the housing (not illustrated). The oil reserving ring 18 is a single-piece member having a cylindrical portion 21, an annular plate-shaped bottom-side flange 22 and an annular plate-shaped supply-side flange 23. The cylindrical portion 21 extends along the inner ring spacer 15 that defines the annular space 17 in cooperation with the outer ring spacer 16. The bottom-side flange 22 extends radially outward from an axial peripheral edge of the cylindrical portion 21, the axial peripheral edge being located close to the bottom wall 20 of the outer ring spacer 16. The supply-side flange 23 extends radially outward from a peripheral edge on the opposite side of the cylindrical portion 21 from the bottom wall 20. An annular continuous grease reservoir 25 is defined by the peripheral wall 19 of the outer ring spacer 16, and by the cylindrical portion 21, the bottom-side flange 22 and the supply-side flange 23, which constitute the oil reserving ring 18. The grease reservoir 25 has an opening 24 that opens toward the rolling bearing 3.

The supply-side flange 23 of the oil reserving ring 18 is inserted in the rolling bearing 3, that is, positioned between the inner ring 5 and the outer ring 6, so as to be located in a region radially inward of the annular groove 14. The supply-side flange 23 has a diameter that is smaller than that of the bottom-side flange 22. Specifically, the bottom-side flange 22 formed to have such a diameter that, when the oil reserving ring 18 is accommodated in the annular space 17, an outer peripheral face of the oil reserving ring 18 is in contact with the peripheral wall 19 of the outer ring spacer 16. On the other hand, the diameter of the supply-side flange 23 is smaller than that of the bottom-side flange 22. Thus, an annular clearance is defined between the supply-side flange 23 and the peripheral wall 19 of the outer ring spacer 16. The clearance serves as the opening 24 that is an example of a flow passage according to the invention, which provides communication between the grease reservoir 25 and the inside of the rolling bearing 3 (the annular groove 14).

The grease reserving member 4 has through-holes 26 that continuously pass through the bottom wall 20 of the outer ring spacer 16 and the bottom-side flange 22 of the oil reserving ring 18. In the present embodiment, the through-holes 26 include first through-holes 26L and second through-holes 26S that are smaller than the first through-holes 26L. The first through-holes 26L and the second through-holes 26S are formed at prescribed intervals along the circumferential direction of the grease reserving member 4. For example, each first through-hole 26L has a diameter that is substantially equal to the width of the grease reservoir 25 in the radial direction of the oil reserving ring 18. Note that, the first through-holes 26L and the second through-holes 26S may be alternately arranged as illustrated in FIG. 2. However, the first through-holes 26L may be arranged in clusters, and the second through-holes 26S may be arranged in clusters.

Threads are formed in inner peripheral faces that define the second through-holes 26S. By screwing bolts 27 into the threads in the second through-holes 26S, the oil reserving ring 18 is secured to the outer ring spacer 16. As the grease G charged in the grease reservoir 25 and the annular groove 14, there may be used grease that is composed of thickener such as a urea compound, Ba complex soap or Li complex soap, and base oil such as ester or poly-alpha olefin. In the present embodiment, as will be described later, it is necessary to form channels 28 having a prescribed shape in the grease G. Thus, it is preferable to impart a certain degree of viscosity to the grease G in order to prevent the grease G from being fluidized to block the channels 28.

As illustrated in FIG. 2, the channels 28 are formed in the grease G. The channels 28 are formed at prescribed intervals along the circumferential direction of the outer ring spacer 16. For example, in FIG. 2, six channels 28 in total are formed at angular intervals of 60 degrees along the circumferential direction of the outer ring spacer 16. The channels 28 are located so as to be opposed respectively to the first through-holes 26L. The channels 28 are axial channels that are extended from one side of the grease G, which faces the opening 24 (refer to FIG. 1), toward the bottom side of the grease reservoir 25 along the axial direction of the outer ring spacer 16.

The longitudinal direction of each channel 28 is along the radial direction of the outer ring spacer 16. That is, as illustrated in FIG. 2, when the channels 28 are viewed from the axial direction of the outer ring spacer 16, each channel 28 has a length L that is relatively long along the radial direction from the axis of the outer ring spacer 16 toward the outer periphery of the outer ring spacer 16, and each channel 28 has a width W that is smaller than the length L and that is along the circumferential direction around the axis of the outer ring spacer 16. Especially, the length L is preferably set to be larger than a radial opening width $W_2$ of the opening 24 of the grease reservoir 25, by overlapping the channels 28 with the supply-side flange 23 of the oil reserving ring 18 in the radial direction of the outer ring spacer 16.

More specifically, in the present embodiment, the channels 28 are formed so as to extend over the entire range from the opening 24 of the grease reservoir 25 to the bottom-side flange 22 of the oil reserving ring 18 in the axial direction of the outer ring spacer 16. Further, the channels 28 are formed so as to extend over the entire range from the cylindrical portion 21 of the oil reserving ring 18 to the peripheral wall 19 of the outer ring spacer 16 in the radial direction of the outer ring spacer 16. Thus, the grease G is completely partitioned into multiple sections 29 at prescribed positions by the channels 28. That is, the grease G is partitioned into the multiple sections 29 (six sections 29 in FIG. 2) along the circumferential direction of the outer ring spacer 16. Each of the sections 29 of the grease G has end faces 30 (the outer surfaces of the grease G formed by the channels 28) that are located at opposite end portions of the section 29 in the circumferential direction of the outer ring spacer 16. Each end face 30 is exposed to the channel 28 at an area wider than an area at which the opening 24 is opposed to the rolling bearing 3.

Figure 3A:
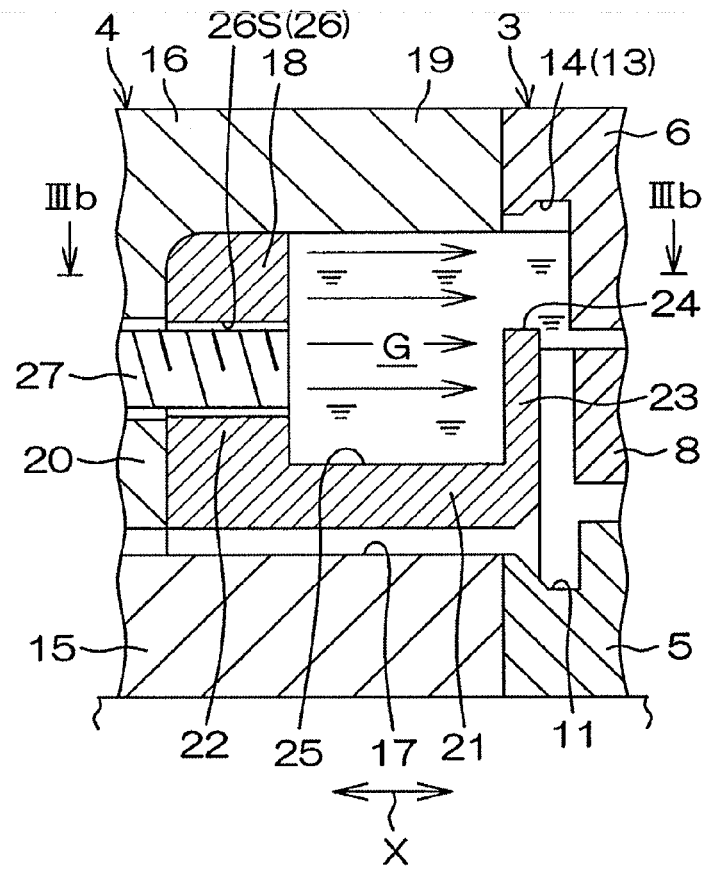
Figure 3B:
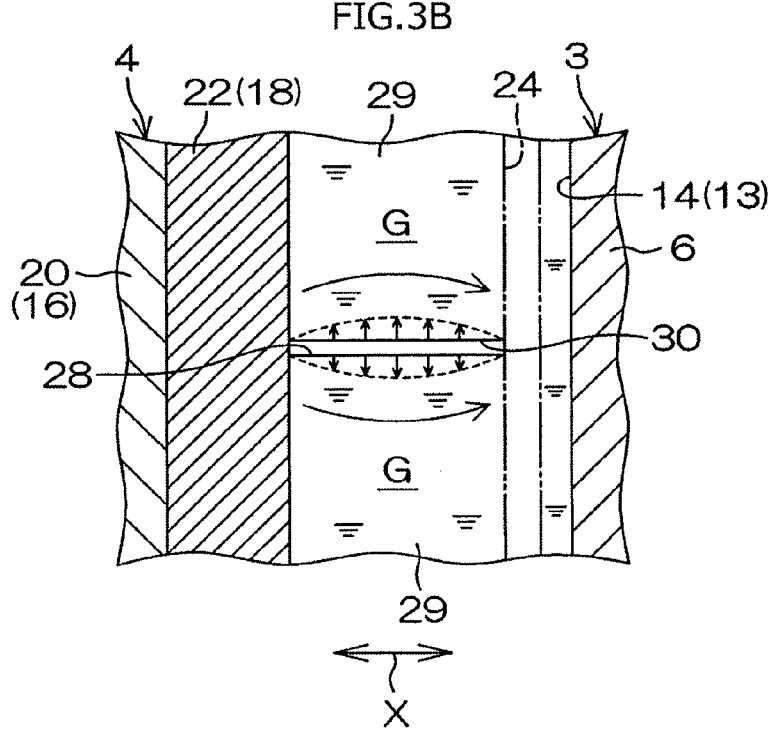

Note that, the shape of each channel 28 is not particularly limited, and each channel 28 may have a flat plate shape as illustrated in FIG. 2, an elliptical columnar shape or a triangular prism shape. FIG. 3A and FIG. 3B are views for describing the flow of the base oil that is contained in the grease G. FIG. 3A is an enlarged sectional view illustrating main portions in FIG. 1. FIG. 3B is a sectional view obtained by cutting the rolling bearing unit 1 along the line IIIb-IIIb in FIG. 3A.

Next, the flow of the base oil of the grease G charged in the grease reservoir 25 will be described. As illustrated in FIG. 3A and FIG. 3B, in the rolling bearing unit 1, the annular groove 14 of the rolling bearing 3 is filled with the grease G for initial lubrication. Further, the grease reservoir 25 is filled with the grease G for replenishment. The grease G in the annular groove 14 and the grease G in the grease reservoir 25 are connected to each other. Thus, as the base oil of the grease G in the annular groove 14 is consumed due to operation of the rolling bearing 3, the base oil of the grease G in the grease reservoir 25 moves through the grease G toward the rolling bearing 3.

At this time, the channels 28 are formed in the grease G in the grease reservoir 25, and the end faces 30 of the grease G are exposed to the channels 28. Thus, the base oil of the grease G is supplied from the end faces 30 exposed to the channels 28 prior to the supply of the base oil of the grease G from the region of the grease G, which faces the opening 24. Thus, the base oil is consumed from the end faces 30 side of the grease G, and thus the end faces 30 are recessed. As a result, the channels 28 expand, that is, the channels 28 bulge on respective sides (refer to FIG. 3B). In association with the expansion of the channels 28, as indicated by solid arrows in FIG. 3A and FIG. 3B, the flow of the base oil is produced in the axial direction X of the outer ring spacer 16 from the bottom side of the grease reservoir 25 toward the opening 24. As a result, the grease G located on the bottom side of the grease reservoir 25 is effectively utilized to smoothly supply the base oil to the rolling bearing 3 (annular groove 14). Thus, it is possible to prevent the grease G from being cracked along the circumferential direction of the outer ring spacer 16. Even if the grease G is cracked, depletion of the base oil near the rolling bearing 3 is prevented. Thus, the base oil of the grease G is continuously supplied to the rolling bearing 3 for a long time, and it is therefore possible to prolong the service life of the rolling bearing 3 with satisfactory lubrication performance. Further, because only formation of the channels 28 in the grease G in the grease reservoir 25 is required, it is possible to prevent the configuration of the rolling bearing unit 1 from being complicated.

In the present embodiment, the channels 28 are formed over the entire range from the opening 24 of the grease reservoir 25 to the bottom-side flange 22 of the oil reserving ring 18 (refer to FIG. 3B) in the axial direction X of the outer ring spacer 16. Further, the channels 28 are formed over the entire range from the cylindrical portion 21 of the oil reserving ring 18 to the peripheral wall 19 of the outer ring spacer 16 (refer to FIG. 2) in the radial direction of the outer ring spacer 16. Thus, the surface area of each end face 30 is maximized in the grease reservoir 25 having a limited size. As a result, the flow of the base oil from the bottom side of the grease reservoir 25 toward the opening 24 in the axial direction X of the outer ring spacer 16 is efficiently produced.

Further, the multiple channels 28 are formed in the grease G. With this configuration as well, the total surface area of the end faces 30 of the grease G is increased. As a result, the flow of the base oil from the bottom side of the grease reservoir 25 toward the opening 24 in the axial direction X of the outer ring spacer 16 is efficiently produced. Further, the grease G is completely partitioned into the multiple sections 29 by the channels 28. That is, each of the sections 29 is physically separated from the adjacent sections 29 by the channels 28. Thus, even if a crack is formed in one of the sections 29 of the grease G, development of the crack is stopped by the channels 28 that are adjacent to this section 29, and thus the crack in the grease G remains in the one section 29. As a result, the sections 29 adjacent to the cracked section 29 are not influenced by the crack in the grease G in the cracked section 29. Thus, it is possible to continuously supply the base oil in the grease G.

FIG. 4A to FIG. 4C are sectional views of the rolling bearing unit 1, for sequentially describing steps related to formation of the channels 28 in the grease G illustrated in FIG. 2. The channels 28 in the grease G are formed according to, for example, the steps illustrated in FIG. 4A to FIG. 4C. Specifically, at first, the inner ring spacer 15, and the outer ring spacer 16 and the oil reserving ring 18 are fitted to each other to assemble the grease reserving member 4, and then, as illustrated in FIG. 4A, spacers 31 are inserted into the grease reservoir 25 through the through-holes 26 (for example, the first through-holes 26L) from the back side of the outer ring spacer 16 (on the opposite side of the outer ring spacer 16 from the grease reservoir 25). Each spacer 31 is formed in a shape corresponding to the shape of each channel 28, and the shape of each spacer 31 is designed in advance.

Next, as illustrated in FIG. 4B, the grease G is supplied into the grease reservoir 25 through the opening 24. At this time, the grease G is supplied into the grease reservoir 25 except the spaces occupied by the spacers 31. As illustrated in FIG. 4C, the spacers 31 are pulled out toward the back side of the outer ring spacer 16 through the through-holes 26 through which the spacers 31 are inserted. Thus, in the grease reservoir 25, the channels 28 that partition the grease G into the sections 29 are defined in the spaces in which the spacers 31 are occupied before being pulled out.

Figure 5A:
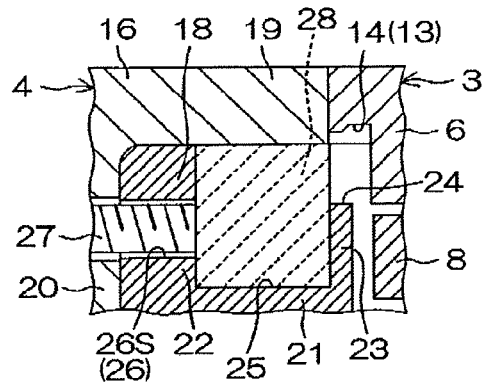
FIG. 5A to FIG. 5C are views for describing variations of the forms of the channels in the grease illustrated in FIG. 2.
Figure 5B:
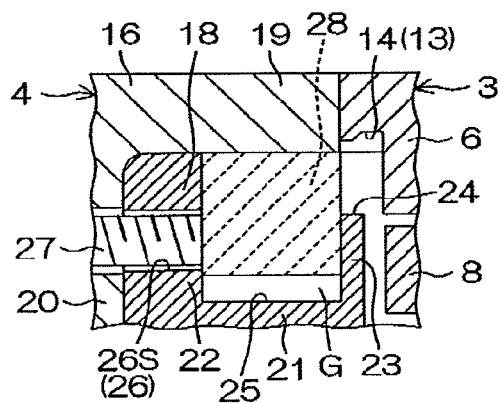
Figure 5C:
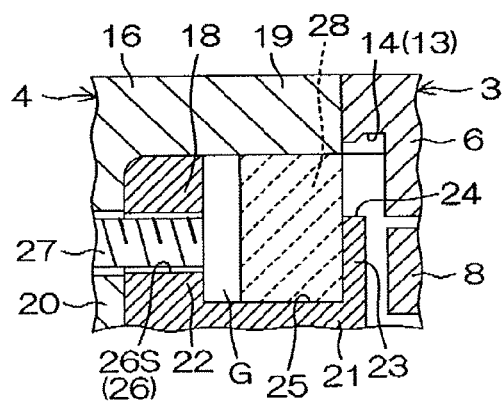

Thus, the channels 28 are formed in the grease G through a simple work in which the spacers 31 are inserted into and pulled out from the grease reservoir 25. While the example embodiment of the invention has been described above, the invention may be implemented in various other embodiments. For example, in the above-described embodiment, as illustrated in FIG. 5A, the channels 28 are formed over the entire range from the opening 24 of the grease reservoir 25 to the bottom-side flange 22 of the oil reserving ring 18 in the axial direction of the outer ring spacer 16, and are formed over the entire range from the cylindrical portion 21 of the oil reserving ring 18 to the peripheral wall 19 of the outer ring spacer 16 in the radial direction of the outer ring spacer 16. However, as illustrated in, for example, FIG. 5B, the channels 28 may be formed in the radial direction of the outer ring spacer 16, over only a part of the entire range (for example, from the peripheral wall 19 of the outer ring spacer 16 to a position apart from the cylindrical portion 21 of the oil reserving ring 18, that is, the channels 28 are apart from the cylindrical portion 21 of the oil reserving ring 18) although the channels 28 are formed over the entire range in the axial direction of the outer ring spacer 16. As illustrated in, for example, FIG. 5C, the channels 28 may be formed in the axial direction of the outer ring spacer 16 over only a part of the entire range (for example, from the opening 24 of the grease reservoir 25 to a position apart from the bottom-side flange 22 of the oil reserving ring 18, that is, the channels 28 are apart from the bottom-side flange 22 of the oil reserving ring 18) although the channels 28 are formed over the entire range in the radial direction of the outer ring spacer 16.

As an example of the grease reservoir 25, the annular and continuous grease reservoir 25 is adopted in the above-described embodiment. However, the grease reservoir 25 may be partitioned into multiple chambers along the circumferential direction of the outer ring spacer 16. In the above-described embodiment, the inner ring 5 and the inner ring spacer 15 are rotary members that are rotated together with the main spindle 2 whereas the outer ring 6 and the outer ring spacer 16 are stationary members that are secured to the housing (not illustrated). However, the invention may be also applied to a case in which the outer ring 6 and the outer ring spacer 16 are rotary members, whereas the inner ring 5 and the inner ring spacer 15 are stationary members.

Further, the invention may be implemented in various other embodiments within the scope of the appended claims.

What is claimed is:

1. A rolling bearing unit comprising:
a rolling bearing including an inner ring, an outer ring and a plurality of rolling elements disposed between the inner ring and the outer ring;
an annular spacer disposed adjacent to one axial end of the rolling bearing, the annular spacer having a grease reservoir in a form of a groove extending along a circumferential direction of the annular spacer, and a flow passage that provides communication between the grease reservoir and an inside of the rolling bearing; and
grease retained in the grease reservoir,
at least one channel being formed in the grease to extend from the flow passage along an axial direction of the annular spacer.

2. The rolling bearing unit according to claim 1, wherein:
a plurality of channels is formed in the grease; and
the channels are located at intervals along the circumferential direction of the annular spacer.

3. The rolling bearing unit according to claim 2, wherein the channel is formed over an entire range from the flow passage to a bottom portion of the grease reservoir in the axial direction of the annular spacer.

4. The rolling bearing unit according to claim 3, wherein the channel is formed over an entire range of the grease reservoir in a radial direction of the annular spacer, the grease being partitioned into multiple sections by the channel.

5. The rolling bearing unit according to claim 2, wherein the channel is formed over an entire range of the grease reservoir in a radial direction of the annular spacer, the grease being partitioned into multiple sections by the channel.

6. The rolling bearing unit according to claim 1, wherein the channel is formed over an entire range from the flow passage to a bottom portion of the grease reservoir in the axial direction of the annular spacer.

7. The rolling bearing unit according to claim 6, wherein the channel is formed over an entire range of the grease reservoir in a radial direction of the annular spacer, the grease being partitioned into multiple sections by the channel.

8. The rolling bearing unit according to claim 1, wherein the channel is formed over an entire range of the grease reservoir in a radial direction of the annular spacer, the grease being partitioned into multiple sections by the channel.

9. The rolling bearing unit according to claim 1, wherein:
at least one spacer is disposed in the grease reservoir to extend along an axial direction of the annular spacer;
the at least one spacer is used to make the channel; and
the at least one spacer is removed after the grease is supplied.

* * * * *